(12) United States Patent
Yoshida et al.

(10) Patent No.: US 8,518,289 B2
(45) Date of Patent: Aug. 27, 2013

(54) MN-ZN-CO FERRITE CORE AND METHOD FOR PRODUCING THE SAME

(75) Inventors: Hirofumi Yoshida, Chiba (JP); Yukiko Nakamura, Chiba (JP); Satoshi Goto, Okayama (JP)

(73) Assignee: JFE Chemical Corporation, Tokyo (JP)

( * ) Notice: Subject to any disclaimer, the term of this patent is extended or adjusted under 35 U.S.C. 154(b) by 250 days.

(21) Appl. No.: 13/146,830

(22) PCT Filed: Jan. 29, 2010

(86) PCT No.: PCT/JP2010/051648
§ 371 (c)(1), (2), (4) Date: Jul. 28, 2011

(87) PCT Pub. No.: WO2010/087513
PCT Pub. Date: Aug. 5, 2010

(65) Prior Publication Data
US 2011/0279216 A1    Nov. 17, 2011

(30) Foreign Application Priority Data

Jan. 29, 2009  (JP) ................................. 2009-018808
Feb. 10, 2009  (JP) ................................. 2009-028033

(51) Int. Cl.
*C04B 35/38* (2006.01)

(52) U.S. Cl.
USPC .................. 252/62.62; 252/62.63; 252/62.59

(58) Field of Classification Search
USPC .................. 252/62.62, 62.63, 62.59
See application file for complete search history.

(56) References Cited

FOREIGN PATENT DOCUMENTS

| JP | 2002-128570 | | 5/2002 |
|---|---|---|---|
| JP | 2005-109356 | | 4/2005 |
| JP | 2005-272229 | | 10/2005 |
| JP | 2006-273673 | | 10/2006 |
| JP | 2008-143744 | * | 6/2008 |

OTHER PUBLICATIONS

Translation for JP 2008-143744, Jun. 26, 2008.*
International Search Report, PCT/JP2010/051648, May 11, 2010.

* cited by examiner

*Primary Examiner* — Carol M Koslow
(74) *Attorney, Agent, or Firm* — Young & Thompson

(57) ABSTRACT

A Mn—Zn—Co ferrite core includes a basic component, sub-components, and unavoidable impurities. As the sub-components, silicon oxide (in terms of $SiO^2$): 50-400 mass ppm and calcium oxide (in terms of CaO): 1000-4000 mass ppm are added to the basic component consisting of iron oxide (in terms of $Fe_2O_3$): 51.0-53.0 mol %, zinc oxide (in terms of ZnO): more than 12.0 mol % and 18.0 mol % or less, cobalt oxide (in terms of CoO): 0.04-0.60 mol %, and manganese oxide (in terms of MnO): balance; Phosphorus, boron, sulfur, and chlorine in the unavoidable impurities are reduced as follows, phosphorus: less than 3 mass ppm, boron: less than 3 mass ppm, sulfur: less than 5 mass ppm, and chlorine: less than 10 mass ppm; and a ratio of a measured specific surface of the Mn—Zn—Co ferrite core to an ideal specific surface of the Mn—Zn—Co ferrite core satisfies: Measured specific surface/ideal specific surface <1500.

5 Claims, 2 Drawing Sheets

IDEAL SPECIFIC SURFACE = [2 × {(OUTER DIAMETER)$^2$ − (INNER DIAMETER)$^2$}/4 × π + {(OUTER DIAMETER) + (INNER DIAMETER)} × π × HEIGHT]/ CORE MASS

COMPRESSIVE RUPTURE STRENGTH OF
GRANULATED POWDER = 0.80 MPa →
DENSE

COMPRESSIVE RUPTURE STRENGTH OF
GRANULATED POWDER = 1.41 MPa →
CAVITIES REMAIN

MN-ZN-CO FERRITE CORE AND METHOD FOR PRODUCING THE SAME

TECHNICAL FIELD

The present invention relates to a Mn—Zn—Co ferrite core that is suitably used as, for example, a magnetic core for a pulse transformer in an Ethernet (registered trademark) device; and a method for producing such a Mn—Zn—Co ferrite core.

BACKGROUND ART

Ethernet devices include pulse transformers for the purpose of achieving impedance match and electrical insulation in input/output terminals. Such transformers include magnetic cores generally composed of soft magnetic materials. Such pulse transformers are required to have a high incremental permeability $\mu\Delta$ under the application of a direct-current magnetic field in a temperature range of −40 to 85° C., for example, as defined in American standards ANSI X3.263-1995[R2000]. The incremental permeability $\mu\Delta$ is a value that indicates the degree of magnetization of a magnetic core under the application of a magnetic field.

A soft magnetic material used in the application is generally Mn—Zn ferrite. Mn—Zn ferrite is advantageous, for example, in that a high permeability and a high inductance can be easily achieved for a soft magnetic material and Mn—Zn ferrite is less expensive than amorphous metals and the like. Developments of Mn—Zn ferrites suitable for the application are performed and described in, for example, Patent Literatures 1 and 2.

However, Mn—Zn ferrite is an oxide magnetic material and hence has drawbacks in that, compared with metal magnetic materials, magnetic characteristics considerably vary with change in temperature and a material having a high permeability has a low saturation flux density.

Accordingly, stable magnetic characteristics are less likely to be achieved in a wide temperature range, in particular, in a high temperature range, which is problematic.

To overcome the temperature dependency of characteristics of Mn—Zn ferrite, it is known that addition of CoO having positive magnetic anisotropy is effective. For example, Patent Literature 1 states that a Mn—Zn—Co ferrite for the application allows a high permeability under the application of a direct-current magnetic field of about 33 A/m.

The inventors previously developed "A ferrite core comprising a basic component, additional components, and impurities, wherein the basic component consists of $Fe_2O_3$: 51.0 to 53.0 mol %, ZnO: 13.0 to 18.0 mol %, CoO: 0.04 to 0.60 mol %, and the balance being MnO; the ferrite contains, as the additional components, $SiO_2$: 0.005 to 0.040 mass % and CaO: 0.020 to 0.400 mass % relative to an entirety of the ferrite; the ferrite contains, as the impurities, P: less than 3 mass ppm and B: less than 3 mass ppm relative to the entirety of the ferrite; and an average pulverized particle size is 1.00 to 1.30 μm", which is suitable as a magnetic core for a pulse transformer in an Ethernet device, and disclosed the ferrite core in Patent Literature 3.

The development of such a ferrite core allows a high incremental permeability of 2300 or more under the application of a direct-current magnetic field of 33 A/m in a wide temperature range of −40° C. to 85° C.

However, a Mn—Zn—Co ferrite core in the application mainly has the form of a closed magnetic circuit with a small size represented by a toroidal core having an outer diameter of about 2 to 6 mm. In the case of such a small size, since there is a high probability of mold breakage in compaction, it is impossible to apply a high compaction pressure. Accordingly, when a surface of a core that is a fired compact as illustrated in FIG. 1 is observed with a scanning electron microscope (SEM), there are cases where cavities due to insufficient disintegration of granulated powder remain as illustrated in FIG. 2(b).

When a core includes such cavities, the volume occupied by the magnetic material is small and hence magnetic fluxes concentrate in the magnetic material region and a magnetic flux density locally increases. Accordingly, the same phenomenon as an increase in a superposed magnetic field seemingly occurs in the magnetic material region and, as a result, the incremental permeability decreases. Thus, it is difficult to continuously maintain an incremental permeability of 2000 or more in a wide temperature range of −40° C. to 85° C.

CITATION LIST

Patent Literature 1: Japanese Unexamined Patent Application Publication No. 2004-196632
Patent Literature 2: Japanese Unexamined Patent Application Publication No. 2007-197246
Patent Literature 3: Japanese Unexamined Patent Application Publication No. 2008-143744

SUMMARY OF INVENTION

Technical Problem

The present invention advantageously overcomes the above-described problem. An object of the present invention is to propose a Mn—Zn—Co ferrite core that has an excellent characteristic of having an incremental permeability $\mu\Delta$ of 2000 or more continuously in a wide temperature range of −40° C. to 85° C. under the application of a direct-current magnetic field of 33 A/m; and an advantageous method for producing such a Mn—Zn—Co ferrite core.

Solution to Problem

Features of the present invention are as follows.
1. A Mn—Zn—Co ferrite core comprising a basic component, sub-components, and unavoidable impurities, wherein, as the sub-components,
  silicon oxide (in terms of $SiO_2$): 50 to 400 mass ppm and
  calcium oxide (in terms of CaO): 1000 to 4000 mass ppm
    are added to the basic component consisting of
  iron oxide (in terms of $Fe_2O_3$): 51.0 to 53.0 mol %,
  zinc oxide (in terms of ZnO): more than 12.0 mol % and 18.0 mol % or less,
  cobalt oxide (in terms of COO): 0.04 to 0.60 mol %, and
  manganese oxide (in terms of MnO): balance;
amounts of phosphorus, boron, sulfur, and chlorine in the unavoidable impurities are reduced as follows
  phosphorus: less than 3 mass ppm,
  boron: less than 3 mass ppm,
  sulfur: less than 5 mass ppm, and
  chlorine: less than 10 mass ppm; and
a ratio of a measured specific surface of the Mn—Zn—Co ferrite core to an ideal specific surface of the Mn—Zn—Co ferrite core satisfies formula (1) below $$\text{Measured specific surface/ideal specific surface} < 1500 \quad (1)$$

where the measured specific surface represents a specific surface (m²/g) determined by a BET method (multipoint method) in JIS Z 8830 (2001); and the ideal specific surface represents a specific surface (m²/g) calculated from size and mass of the core on an assumption that the core is in an ideal state of having no cavities.

2. The Mn—Zn—Co ferrite core according to 1 above, wherein the sub-components further include one or more selected from zirconium oxide (in terms of $ZrO_2$): 0.005 to 0.075 mass %;
tantalum oxide (in terms of $Ta_2O_5$): 0.005 to 0.075 mass %;
hafnium oxide (in terms of $HfO_2$): 0.005 to 0.075 mass %; and
niobium oxide (in terms of $Nb_2O_5$): 0.005 to 0.075 mass %.

3. The Mn—Zn—Co ferrite core according to claim 2, wherein the ratio of the measured specific surface of the Mn—Zn—Co ferrite core to the ideal specific surface of the Mn—Zn—Co ferrite core satisfies formula (1)' below $$\text{Measured specific surface/ideal specific surface} \leq 1850 \quad (1)'$$

where the measured specific surface represents a specific surface (m²/g) determined by the BET method (multipoint method) in JIS Z 8830 (2001); and the ideal specific surface represents a specific surface (m²/g) calculated from the size and mass of the core on the assumption that the core is in the ideal state of having no cavities.

4. A method for producing the Mn—Zn—Co ferrite core according to 1 or 2 above, the method comprising calcining the basic component according to 1 above to provide a calcined powder, mixing the calcined powder with the sub-components according to 1 or 2 above, subsequently granulating the mixture of the calcined powder with the sub-components into a granulated powder having a compressive rupture strength of 1.10 MPa or less, and then compacting and subsequently firing the granulated powder.

5. A method for producing the Mn—Zn—Co ferrite core according to 3 above, the method comprising calcining the basic component according to 1 above to provide a calcined powder, mixing the calcined powder with the sub-components according to 2 above, subsequently granulating the mixture of the calcined powder with the sub-components into a granulated powder having a compressive rupture strength of 1.30 MPa or less, and then compacting and subsequently firing the granulated powder.

Advantageous Effects of Invention

According to the present invention, a Mn—Zn—Co ferrite core can be provided that has an excellent characteristic of having an incremental permeability μΔ of 2000 or more continuously in a wide temperature range of −40° C. to 85° C. under the application of a direct-current magnetic field of 33 A/m.

DESCRIPTION OF EMBODIMENTS

Figure 1:
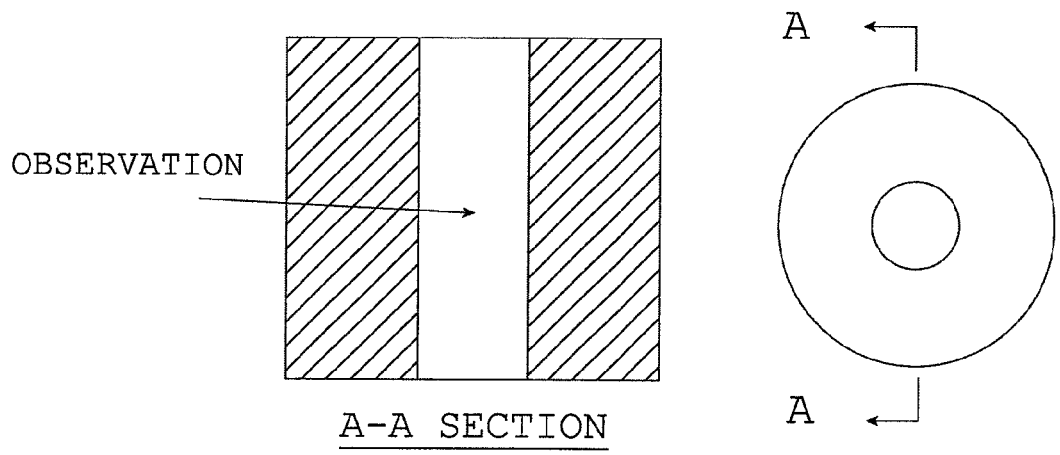
FIG. 1 illustrates a section of a Mn—Zn—Co ferrite core, the section being observed for cavities.

To overcome the above-described problem, the inventors have performed thorough studies. As a result, the inventors have achieved findings described below.

When a magnetic field is superposed; domain walls having been in a state prior to the superposition of the magnetic field move within the core being magnetized. When the core has a content of impurities more than a specific value, exaggerated grain growth is caused in the core, which significantly hampers the motion of domain walls. An incremental permeability is a value that indicates the degree of magnetization of the core under the superposition of a magnetic field. Under the superposition of a magnetic field of 33 A/m, magnetization mainly proceeds through domain wall motion. Accordingly, in a state where, for example, segregation of components in exaggerated grains hampers domain wall motion, the incremental permeability significantly decreases. Thus, to achieve a higher incremental permeability under the superposition of a magnetic field of 33 A/m, exaggerated grain growth needs to be strictly suppressed.

The inventors have studied how to suppress exaggerated grain growth and have found for the first time that, by more strictly limiting the content of impurities than before, a Mn—Zn—Co ferrite core having a high incremental permeability even under the superposition of a high magnetic field can be achieved.

In addition, the inventors encounter a large number of cases where, in spite of optimization in terms of the above-described components, ferrite core products having a large number of cavities in the cores do not have a desirable incremental permeability.

The inventors have also performed thorough studies on this respect. As a result, the inventors have found that cavities in a core are represented by numerical variation of an increase in the specific surface of the core; and, when an ideal specific surface of the core is calculated from the size and form of the core on the assumption that the surface of the core is in an ideal state of complete flatness, and a ratio of the measured specific surface to the ideal specific surface is made less than a specific value, the core has a small number of cavities and a desirable incremental permeability.

The inventors have also found that, to make the measured specific surface/ideal specific surface be less than a specific value, it is necessary to make the compressive rupture strength of a granulated powder be 1.10 MPa or less in the production process of a Mn—Zn—Co ferrite core, the compressive rupture strength being measured by a procedure defined in JIS Z 8841 in which measurements of granules in terms of compressive rupture strength are defined.

The present invention is based on the above-described findings.

Hereinafter, the present invention will be specifically described.

The reasons why the composition of the basic component of a Mn—Zn—Co ferrite core according to the present invention is limited to the above-described ranges will be described.

Iron Oxide (in Terms of $Fe_2O_3$): 51.0 to 53.0 mol %

When iron oxide in the basic component is less than 51.0 mol % or is more than 53.0 mol %, the incremental permeability μΔ under the application of a direct-current magnetic field decreases in a low-temperature range and a high-temperature range. Accordingly, the content of iron oxide in terms of $Fe_2O_3$ is made in the range of 51.0 to 53.0 mol %, preferably in the range of 52.0 to 53.0 mol %.

Zinc Oxide (in Terms of ZnO): more than 12.0 mol % and 18.0 mol % or Less

As the content of zinc oxide increases, the incremental permeability μΔ under the application of a direct-current magnetic field increases. Accordingly, the content of zinc oxide is made more than 12.0 mol %. However, when the content of zinc oxide is more than 18.0 mol %, in a low-temperature range, the incremental permeability $\mu\Delta$ under the application of a direct-current magnetic field decreases; and, in a high-temperature range, the Curie temperature at which a ferromagnetic material loses its magnetism decreases and the incremental permeability $\mu\Delta$ under the application of a direct-current magnetic field also decreases. Accordingly, the content of zinc oxide in terms of ZnO is made in the range of more than 12.0 mol % and 18.0 mol % or less, preferably in the range of 14.0 to 17.0 mol %.

Cobalt Oxide (in Terms of CoO): 0.04 to 0.60 mol %

Only when an appropriate amount of cobalt oxide having positive magnetic anisotropy is contained, a high incremental permeability $\mu\Delta$ of 2000 or more can be maintained in a wide temperature range of −40° C. to 85° C. under the application of a direct-current magnetic field. However, when the content of cobalt oxide is less than 0.04 mol %, the effect of adding cobalt oxide is not sufficiently provided. When the content of cobalt oxide is more than 0.60 mol %, the incremental permeability $\mu\Delta$ decreases in the entire temperature range. Accordingly, the content of cobalt oxide in terms of CoO is made in the range of 0.04 to 0.60 mol %, preferably in the range of 0.08 to 0.50 mol %.

Manganese Oxide (in Terms of MnO): Balance

The present invention relates to a Mn—Zn—Co ferrite core and the balance in the composition of the basic component needs to be manganese oxide. This is because, by making the ferrite contain manganese oxide, a high incremental permeability $\mu\Delta$ of 2000 or more cannot be achieved under the application of a direct-current magnetic field of 33 A/m. The preferred range of manganese oxide in terms of MnO is 28.0 to 33.0 mol %.

The contents of iron oxide, zinc oxide, cobalt oxide, and manganese oxide that constitute the basic component are adjusted such that the total amount of iron oxide in terms of $Fe_2O_3$, zinc oxide in terms of ZnO, cobalt oxide in terms of CoO, and manganese oxide in terms of MnO is 100 mol %.

The reasons why the composition of the sub-components of a Mn—Zn—Co ferrite core according to the present invention is limited to the above-described ranges will be described.

Silicon Oxide (in Terms of $SiO_2$): 50 to 400 Mass ppm

Silicon oxide has an effect of reducing the number of vacancies remaining in crystal grains to thereby increase the incremental permeability $\mu\Delta$ under the application of a direct-current magnetic field. However, when the content of silicon oxide is less than 50 mass ppm, the effect of adding silicon oxide is not sufficiently exhibited; and when the content of silicon oxide is more than 400 mass ppm, exaggerated grains appear and the incremental permeability $\mu\Delta$ considerably decreases under the application of a direct-current magnetic field. Accordingly, the content of silicon oxide in terms of $SiO_2$ is made in the range of 50 to 400 mass ppm, preferably in the range of 100 to 250 mass ppm.

Calcium Oxide (in Terms of CaO): 1000 to 4000 Mass ppm

Calcium oxide segregates in crystal grain boundaries of a Mn—Zn—Co ferrite to provide an effect of suppressing growth of crystal grains. As a result, the initial permeability $\mu_i$ is appropriately decreased and the incremental permeability $\mu\Delta$ under the application of a direct-current magnetic field is effectively increased. However, when the content of calcium oxide is less than 1000 mass ppm, the effect of suppressing growth of grains is not sufficiently provided; and when the content of calcium oxide is more than 4000 mass ppm, exaggerated grains appear and the incremental permeability $\mu\Delta$ considerably decreases under the application of a direct-current magnetic field. Accordingly, the content of calcium oxide in terms of CaO is made in the range of 1000 to 4000 mass ppm, preferably in the range of 1000 to 2000 mass ppm.

Note that the initial permeability $\mu_i$ at 23° C. is preferably made about 3900 to 5000.

In the present invention, to increase the incremental permeability $\mu\Delta$ under the application of a direct-current magnetic field, it is important to limit the contents of impurities in a ferrite core, in particular, phosphorus, boron, sulfur, and chlorine simultaneously to ranges below.

Phosphorus: Less than 3 Mass ppm, Boron: Less than 3 Mass ppm

Phosphorus and boron are unavoidable impurities derived from raw material iron oxide. When the content of phosphorus or boron is 3 mass ppm or more, exaggerated grain growth is induced and the incremental permeability $\mu\Delta$ considerably decreases under the superposition of a magnetic field of 33 A/m. Accordingly, the contents of phosphorus and boron are limited to less than 3 mass ppm.

The contents of phosphorus and boron can be limited to less than 3 mass ppm by, for example, a method of using raw material powders of iron oxide, zinc oxide, and manganese oxide that have a high purity and contain phosphorus and boron as less as possible. In addition, the contents of phosphorus and boron in a medium used in mixing and pulverization such as a ball mill or an attritor are preferably low to avoid entry of phosphorus and boron due to abrasion of the medium.

Note that all the values defined herein are quantified by an analytical procedure defined in "Molybdophosphate extraction-separation/molybdophosphoric blue spectrophotometric method" in JIS G 1214 (1998) in terms of the P component and by a procedure defined in "Curcumin spectrophotometric method" in JIS G 1227 (1999) in terms of the B component.

Sulfur: Less than 5 Mass ppm

Sulfur is an unavoidable impurity derived from raw material iron oxide obtained from ferrous sulfide. When the content of sulfur is 5 mass ppm or more, exaggerated grain growth is induced and the incremental permeability $\mu\Delta$ considerably decreases under the superposition of a high magnetic field of 33 A/m. Accordingly, the content of sulfur is limited to less than 5 mass ppm. The content of sulfur is preferably limited to less than 4 mass ppm.

The content of sulfur can be limited to less than 5 mass ppm by, for example, a method in which time for calcination performed at 800° C. or more in the air atmosphere in the production of a Mn—Zn—Co ferrite core is increased to allow reaction between sulfur and oxygen to sufficiently proceed to thereby reduce the content of sulfur.

Note that the S values defined herein are quantified by an analytical procedure for the S component defined in "Methylene blue spectrophotometric method after separation of hydrosulfide" in JIS G 1215 (1994).

Chlorine: Less than 10 Mass ppm

Chlorine is an unavoidable impurity derived from raw material iron oxide obtained from iron chloride. When the content of chlorine is 10 mass ppm or more, exaggerated grain growth is induced and the incremental permeability $\mu\Delta$ considerably decreases under the application of a direct-current magnetic field of 33 A/m. Accordingly, the content of chlorine is limited to less than 10 mass ppm. The content of chlorine is preferably limited to less than 8 mass ppm.

The content of chlorine can be limited to less than 10 mass ppm by, for example, a method in which raw material iron oxide is sufficiently washed with pure water in the production of a Mn—Zn—Co ferrite core to dissolve chlorine highly ionizable in pure water to thereby reduce the content of chlorine.

Note that the Cl values defined herein are quantified by an analytical procedure for the Cl component: "nitric acid decomposition-iron chloride nephelometry".

The content of each unavoidable impurity other than the above-described phosphorus, boron, sulfur, and chlorine is not particularly limited, but is preferably reduced to 50 mass ppm or less.

The basic component, the sub-components, and the reduced components of a Mn—Zn—Co ferrite core according to the present invention have been described so far. In the present invention, the limitation of the component composition of such a core to the above-described ranges only is insufficient and a formula below in terms of surface area needs to be satisfied.

It is important to satisfy the relationship represented by the following formula (1) in terms of the surface area of the core.

$$\text{Measured specific surface/ideal specific surface} < 1500 \quad (1)$$

The measured specific surface is a value determined by a BET method (multipoint method) in JIS Z 8830 (2001) and the unit thereof is $m^2/g$. The ideal specific surface is a value obtained by, on the basis of the size and mass of the ferrite core, dividing the surface area of the core calculated on the assumption that the core is in an ideal state of having no cavities, by the mass of the core; and the unit thereof is also $m^2/g$.

Figure 3:
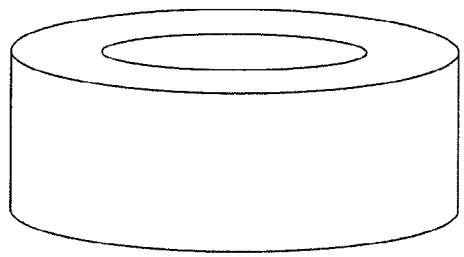
FIG. 3 illustrates the way of calculating an ideal specific surface.
Figure 2:
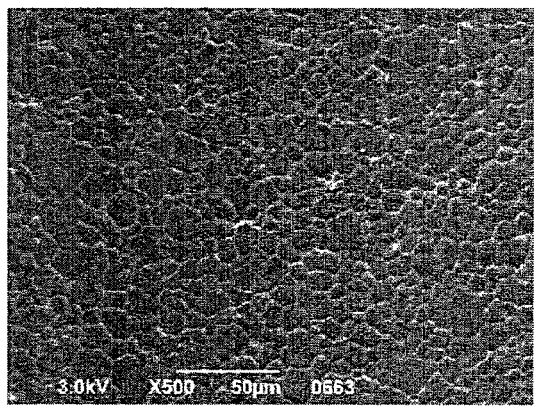
FIG. 2(a) illustrates a state of a core according to the present invention in which no cavities remain.
FIG. 2(b) illustrates a state of an existing core in which cavities remain due to insufficient disintegration of a granulated powder.
Figure 2:
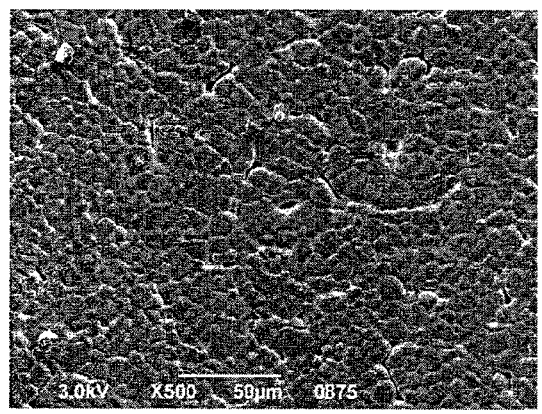

For reference, the way of calculating the ideal specific surface is illustrated in FIG. 3.

When the assumption is made that the core surface is in an ideal state of complete flatness, the specific surface can be calculated with the following formula.

$$\text{Ideal specific surface} = [2 \times \{(\text{outer diameter})^2 - (\text{inner diameter})^2\}/4 \times \pi + \{(\text{outer diameter}) + (\text{inner diameter})\} \times \pi \times \text{height}]/\text{core mass}$$

When a ferrite core includes a large number of cavities, which results in a problem of a decrease in the incremental permeability, a large number of cavities also remain in the surface of the core and hence the measured specific surface is large. Thus, the ratio of measured specific surface/ideal specific surface is high. Thorough studies have been performed on the ratio of measured specific surface/ideal specific surface. As a result, it has been revealed that, when the ratio can be reduced to less than 1500, it can be regarded that a core is obtained in which the incremental permeability does not decrease, that is, a dense core is obtained in which the number of cavities remaining in the surface of the core is small. The ratio of (measured specific surface/ideal specific surface) is preferably 1150 or less.

To reduce the ratio of measured specific surface/ideal specific surface to less than 1500, it is important to optimize granulation conditions in the production process of a Mn—Zn—Co ferrite to provide a soft granulated powder. The production process of a Mn—Zn—Co ferrite is a known technique in which, as the granulation method, a spray drying method is mainly employed, which is described in detail in documents, for example, p. 52 in "Ferrite" (Hiraga, Okutani, and Oshima; Maruzen: 1986).

The hardness of a granulated powder can be represented in a numerical value by the measurement of the compressive rupture strength of a granulated powder defined in JIS Z 8841 (1993). It has been revealed that, when the compressive rupture strength is 1.10 MPa or less, the ratio of measured specific surface/ideal specific surface can be reduced to less than 1500. The compressive rupture strength is preferably 1.00 MPa or less.

Since Mn—Co—Zn ferrite has a low resistivity of less than $10^2$ $\Omega$m, it is often used after a surface thereof is subjected to an insulation coating treatment. However, the measured specific surface defined in the present invention is a measured value of a core that is not subjected to the coating treatment. This is because the coating treatment makes the surface be smooth and hence it becomes impossible to accurately measure the specific surface of a Mn—Zn—Co ferrite.

A Mn—Zn—Co ferrite core according to the present invention may contain, in addition to the above-described components, other components described below as additional sub-components appropriately.

One or more selected from zirconium oxide (in terms of $ZrO_2$): 0.005 to 0.075 mass %; tantalum oxide (in terms of $Ta_2O_5$): 0.005 to 0.075 mass %; hafnium oxide (in terms of $HfO_2$): 0.005 to 0.075 mass %; and niobium oxide (in terms of $Nb_2O_5$): 0.005 to 0.075 mass %

All these components are compounds having a high melting point and, in a Mn—Zn—Co ferrite, decrease the size of crystal grains. Thus, the components suppress generation of coarse crystal grains and increase the incremental permeability $\mu\Delta$ under the application of a direct-current magnetic field. Such an effect is not sufficiently provided when the content of such a component is too low. When the content of such a component is too high, exaggerated grain growth is caused and the incremental permeability $\mu\Delta$ decreases under the application of a direct-current magnetic field. Accordingly, the components are made to be contained in the above-described ranges.

When an appropriate amount of the sub-component such as zirconium oxide, tantalum oxide, hafnium oxide, or niobium oxide is made to be contained, the above-described requirement of the ratio of (measured specific surface/ideal specific surface) is not necessarily strictly applied. Specifically, when such a sub-component is not contained, the ratio of (measured specific surface/ideal specific surface) needs to be reduced to less than 1500; however, when such a sub-component is contained, the allowable range of the ratio of (measured specific surface/ideal specific surface) is widened to 1850 or less as represented by the following formula (1)'

$$\text{Measured specific surface/ideal specific surface} \leq 1850 \quad (1)'$$

In addition, the allowable range of the compressive rupture strength of a granulated powder is also widened to 1.30 MPa or less.

Thus, the production requirements are relaxed and a Mn—Zn—Co ferrite core having desired characteristics are readily obtained.

A preferred grain size of a Mn—Zn—Co ferrite according to the present invention will be described. As described above, generation of exaggerated grains decreases the incremental permeability $\mu\Delta$ under the application of a direct-current magnetic field. Accordingly, an average crystal grain size is preferably 5 μm to less than 15 μm.

Next, a preferred method for producing a Mn—Zn—Co ferrite core according to the present invention will be described.

The powders of iron oxide, zinc oxide, cobalt oxide, and manganese oxide that constitute the basic component are weighed so as to achieve predetermined percentages. The powders are sufficiently mixed and then calcined. The calcined powder is then pulverized. The sub-components are added to the calcined powder so as to achieve predetermined proportions and are pulverized together with the calcined powder. In this process, the powder needs to be made sufficiently uniform such that concentrations of the added components are not localized and the particle size of the calcined powder needs to be decreased to a target average size. The resultant powder is mixed with an organic binder such as polyvinyl alcohol and granulated by a spray drying method or the like into a soft granulated powder having a compressive rupture strength of less than 1.10 MPa. The granulated powder is then compacted into a desired form and subsequently fired under appropriate firing conditions. The pressure applied in the compaction is preferably about 115 to 120 MPa. The firing conditions are preferably a temperature of 1200 to 1400° C. and a time for about 18 to 30 hours.

The compressive rupture strength of the granulated powder can be effectively reduced to less than 1.10 MPa by decreasing the temperature in granulation: specifically, to about 150 to 200° C., which is about 50 to 100° C. lower than the conventional temperature of 250 to 300° C.

When granulation is performed at the conventional temperature of 250 to 300° C., the granulated powder has a compressive rupture strength of about 1.2 to 1.4 MPa. As described above, a target condition of the present invention cannot be satisfied with such a compressive rupture strength.

Measured specific surface/ideal specific surface<1500    (1)

The thus-obtained Mn—Zn—Co ferrite core can have, under the application of a direct-current magnetic field of 33 A/m, a high incremental permeability $\mu\Delta$ of 2000 or more in a temperature range of −40° C. to 85° C., which cannot be achieved in existing Mn—Zn—Co ferrite cores.

Note that existing Mn—Zn—Co ferrite cores have a low incremental permeability $\mu\Delta$ of about 1700 under the application of a direct-current magnetic field of 33 A/m in a wide temperature range of −40° C. to 85° C.

Example 1

Raw material powders were weighed such that the compositions of iron oxide, zinc oxide, cobalt oxide, and manganese oxide that constituted the basic component satisfied percentages in Table 1 in terms of $Fe_2O_3$, ZnO, CoO, and MnO. The raw material powders were mixed with a ball mill for 16 hours and then calcined in the air at 925° C. for 3 hours. The calcined powders were then mixed with, as sub-components, silicon oxide and calcium oxide having been respectively weighed so as to achieve percentages in Table 1 in terms of $SiO_2$ and CaO, and pulverized with the ball mill for 12 hours.

The resultant powder mixtures were mixed with polyvinyl alcohol, granulated at 180° C., and compacted into toroidal cores under the application of a pressure of 118 MPa. The compacts were then put into a kiln and fired at a maximum temperature of 1350° C. Thus, sintered cores having an outer diameter of 6.0 mm, an inner diameter of 3.0 mm, and a height of 4.0 mm were obtained.

A wire was wound ten turns around each specimen obtained in this way. While the core was under the application of a direct-current magnetic field of 33 A/m with a direct-current application apparatus (42841A, manufactured by Agilent Technologies, Inc.), the specimen was measured in terms of incremental permeability $\mu\Delta$ at −40° C., 0° C., 23° C., 70° C., and 85° C. at a measurement voltage of 100 mV and at a measurement frequency of 100 kHz with a LCR meter (4284A, manufactured by Agilent Technologies, Inc.).

Note that the initial permeability $\mu_i$ was measured at 23° C. with the LCR meter (4284A).

In the preparation of the specimens, all the raw materials including iron oxide were highly pure; the ball mill serving as the mixing and pulverization medium had low contents of phosphorus and boron; the calcination was performed under sufficient air flow; and pure water used scarcely contained Cl. As a result, in all the specimens, the final contents of P, B, S, and Cl were respectively 2 mass ppm, 2 mass ppm, 3 mass ppm, and 6 mass ppm.

The compressive rupture strength of the granulated powders measured in accordance with JIS Z 8841 was 0.90±0.05 MPa and hence the number of cavities remaining in the surfaces of the ferrite cores was small. Accordingly, the measured specific surface was 0.453 to 0.493 $m^2/g$ and the ideal specific surface was $4.44 \times 10^{-4}$ $m^2/g$. All the ratios of (measured specific surface/ideal specific surface) were 1020 to 1110, which were less than 1500.

As for the crystal grain size of each specimen, the core was cut; the fracture section was polished; micrographs of three different fields of view of the polished surface at 500× magnification were taken with an optical microscope; size of grains in the micrographs was measured; and the average crystal grain size was calculated from the measured grain size.

The results are also described in Table 1.

TABLE 1

| Specimen No. | Basic component (mol %) | | | | Sub-components (mass %) | | Initial permeability $\mu_i$ | Incremental permeability under application of magnetic field of 33 A/m ($\mu\Delta$) | | | | |
|---|---|---|---|---|---|---|---|---|---|---|---|---|
| | $Fe_2O_3$ | ZnO | CoO | MnO | $SiO_2$ | CaO | 23° C. | −40° C. | 0° C. | 23° C. | 70° C. | 85° C. |
| 1-1 | <u>54.0</u> | 16.0 | 0.40 | Balance | 0.010 | 0.150 | 4700 | 2700 | 4000 | 3900 | 2600 | <u>1900</u> |
| 1-2 | <u>50.5</u> | 16.0 | 0.40 | Balance | 0.010 | 0.150 | 4200 | <u>1900</u> | 3200 | 3500 | 3000 | 2500 |
| 1-3 | 52.9 | 16.0 | 0.04 | Balance | 0.010 | 0.150 | 4600 | 2700 | 3900 | 3900 | 2900 | 2500 |
| 1-4 | 52.0 | 16.0 | <u>0.00</u> | Balance | 0.010 | 0.150 | 5400 | <u>1900</u> | 3800 | 4300 | 2700 | <u>1900</u> |
| 1-5 | 52.0 | 16.0 | 0.40 | Balance | 0.010 | 0.150 | 4500 | 2600 | 3800 | 4000 | 3300 | 2700 |
| 1-6 | 52.0 | 16.0 | <u>0.80</u> | Balance | 0.010 | 0.150 | 3400 | <u>1900</u> | 2600 | 2600 | 2100 | 2000 |
| 1-7 | 52.0 | <u>18.5</u> | 0.40 | Balance | 0.010 | 0.150 | 6000 | <u>1900</u> | 2500 | 3800 | 2100 | <u>1700</u> |
| 1-8 | 52.0 | <u>11.5</u> | 0.40 | Balance | 0.010 | 0.150 | 3500 | <u>1800</u> | 3000 | 3300 | 2000 | <u>1900</u> |
| 1-9 | 51.8 | 16.0 | 0.55 | Balance | 0.010 | 0.150 | 4400 | 2600 | 3700 | 3900 | 3300 | 2800 |
| 1-10 | 52.0 | 16.0 | 0.40 | Balance | <u>0.002</u> | 0.150 | 6400 | <u>1900</u> | 3100 | 3000 | 2600 | <u>1800</u> |
| 1-11 | 52.0 | 16.0 | 0.40 | Balance | 0.010 | <u>0.080</u> | 6600 | <u>1900</u> | 3000 | 3000 | 2600 | <u>1800</u> |
| 1-12 | 52.0 | 16.0 | 0.40 | Balance | 0.025 | 0.250 | 4300 | 2500 | 3600 | 3800 | 3200 | 2600 |
| 1-13 | 52.0 | 16.0 | 0.40 | Balance | <u>0.045</u> | 0.150 | 3400 | <u>1900</u> | 2700 | 2700 | 2000 | <u>1900</u> |

TABLE 1-continued

| | | | | | | | | | | | | |
|---|---|---|---|---|---|---|---|---|---|---|---|---|
| 1-14 | 52.0 | 16.0 | 0.40 | Balance | 0.010 | 0.450 | 3300 | 1800 | 2600 | 2600 | 2000 | 1800 |
| 1-15 | 52.0 | 16.0 | 0.40 | Balance | 0.045 | 0.450 | 2600 | 1300 | 1800 | 1800 | 1600 | 1300 |

| Specimen No. | Average crystal grain size (μm) | Compressive rupture strength of granulated powder (MPa) | Measured specific surface/ideal specific surface | Remarks |
|---|---|---|---|---|
| 1-1 | 8 | 0.90 ± 0.05 | 1020-1110 | Comparative example |
| 1-2 | 8 | | | Comparative example |
| 1-3 | 8 | | | Example of invention |
| 1-4 | 8 | | | Comparative example |
| 1-5 | 8 | | | Example of invention |
| 1-6 | 8 | | | Comparative example |
| 1-7 | 8 | | | Comparative example |
| 1-8 | 8 | | | Comparative example |
| 1-9 | 8 | | | Example of invention |
| 1-10 | 17 | | | Comparative example |
| 1-11 | 23 | | | Comparative example |
| 1-12 | 6 | | | Example of invention |
| 1-13 | 143 | | | Comparative example |
| 1-14 | 137 | | | Comparative example |
| 1-15 | 209 | | | Comparative example |

As described in Table 1, Specimen Nos. 1-3, 1-5, 1-9, and 1-12 serving as examples of the invention all had an excellent characteristic in which the incremental permeability μΔ was continuously 2000 or more in a wide temperature range of −40° C. to 85° C. under the application of a direct-current magnetic field of 33 A/m.

In contrast, in a comparative example (Specimen No. 1-1) in which the content of $Fe_2O_3$ was more than 53.0 mol % and a comparative example (Specimen No. 1-2) in which the content of $Fe_2O_3$ was less than 51.0 mol %, the incremental permeability μΔ at 85° C. and −40° C. was less than 2000.

In a comparative example (Specimen No. 1-4) without containing CoO, the incremental permeability μΔ at −40° C. and 85° C. was less than 2000. In contrast, in a comparative example (Specimen No. 1-6) in which the content of CoO was high, the incremental permeability μΔ decreased in the entire temperature range and, in particular, the incremental permeability μΔ at −40° C. and 85° C. was less than 2000.

In a comparative example (Specimen No. 1-7) in which the content of ZnO was high and more than the upper limit, under the application of a direct-current magnetic field of 33 A/m, the incremental permeability μΔ at −40° C. and 85° C. was less than 2000. In contrast, in a comparative example (Specimen No. 1-8) in which the content of ZnO was less than the lower limit, the incremental permeability μΔ decreased in the entire temperature range and, in particular, the incremental permeability μΔ at −40° C. and 85° C. was less than 2000.

As for $SiO_2$ and CaO, in comparative examples (Specimen Nos. 1-10 and 1-11) in which the content of $SiO_2$ or CaO was less than the appropriate ranges, the initial permeability $μ_i$ excessively increased and, as a result, the incremental permeability μΔ decreased in the entire temperature range, compared with the examples of the invention: the incremental permeability μΔ at −40° C. and 85° C. was less than 2000. In contrast, in comparative examples (Specimen Nos. 1-13, 1-14, and 1-15) in which the content of $SiO_2$ and/or CaO was more than the appropriate ranges, exaggerated grains appeared and, as a result, the incremental permeability μΔ considerably decreased in the entire temperature range.

Example 2

Several iron oxide raw materials having different contents in terms of P, B, S, and Cl were used. The raw materials were weighed on the basis of calculation for achieving the contents of P, B, S, and Cl in Table 2 such that the composition of iron oxide (in terms of $Fe_2O_3$), zinc oxide (in terms of ZnO), cobalt oxide (in terms of CoO), and manganese oxide (in terms of MnO) that constituted the basic component respectively satisfied $Fe_2O_3$: 52.0 mol %, ZnO: 16.0 mol %, CoO: 0.40 mol %, and MnO: the balance. The raw materials were mixed with a ball mill for 16 hours and then calcined in the air at 925° C. for 3 hours. Some of the calcined powders were then mixed with, as sub-components, silicon oxide (100 mass ppm in terms of $SiO_2$) and calcium oxide (500 mass ppm in terms of CaO). All the raw material powders were then pulverized with the ball mill for 12 hours. The resultant powder mixtures were mixed with polyvinyl alcohol, granulated at 180° C., and compacted into toroidal cores under the application of a pressure of 118 MPa. At this time, the granulation temperature was varied such that the resultant granulated powders had various compressive rupture strengths. The compacts were then put into a kiln and fired at a maximum temperature of 1350° C. Thus, sintered cores having an outer diameter of 6.0 mm, an inner diameter of 3.0 mm, and a height of 4.0 mm were obtained.

A wire was wound ten turns around each specimen obtained in this way. The specimen was measured in terms of incremental permeability μΔ at −40° C., 0° C., 23° C., 70° C., and 85° C. at a measurement voltage of 100 mV and at a measurement frequency of 100 kHz under the application of a direct-current magnetic field of 33 A/m with the same direct-current application apparatus and LCR meter as in EXAMPLE. The compressive rupture strength of the granulated powders was measured in accordance with requirements of JIS Z 8841. The measured specific surface was also measured by a BET method (multipoint method) in JIS Z 8830 (2001). The ideal specific surface was calculated from size and weight that were measured in accordance with JIS C 2560. The ratio of (measured specific surface/ideal specific surface) was calculated from the ideal specific surface of $4.44 \times 10^{-4}$ $m^2/g$). The initial permeability $μ_i$ and the average crystal grain size were measured as in EXAMPLE 1.

The results are also described in Table 2.

TABLE 2

| Specimen No. | Sub-components (mass %) ZrO₂ | Sub-components (mass %) Nb₂O₅ | Contents of impurities (mass ppm) P | Contents of impurities (mass ppm) B | Contents of impurities (mass ppm) S | Contents of impurities (mass ppm) Cl | Initial permeability $\mu_i$ 23° C. | Incremental permeability under application of magnetic field of 33 A/m (μΔ) −40° C. | 0° C. | 23° C. | 70° C. | 85° C. |
|---|---|---|---|---|---|---|---|---|---|---|---|---|
| 1-5 | 0 | 0 | 2 | 2 | 3 | 6 | 4500 | 2600 | 3800 | 4000 | 3300 | 2700 |
| 2-1 | | | 2 | 2 | 4 | 8 | 4400 | 2500 | 3700 | 3900 | 3200 | 2600 |
| 2-2 | | | 5 | 2 | 3 | 6 | 3600 | 1900 | 2900 | 3000 | 2500 | 1800 |
| 2-3 | | | 2 | 5 | 3 | 6 | 3500 | 1800 | 2800 | 3000 | 2400 | 1700 |
| 2-4 | | | 2 | 2 | 8 | 6 | 3700 | 1900 | 2900 | 3100 | 2500 | 1900 |
| 2-5 | | | 2 | 2 | 3 | 15 | 3800 | 1900 | 2900 | 3200 | 2500 | 1900 |
| 2-6 | | | 5 | 5 | 3 | 6 | 3400 | 1700 | 2600 | 2800 | 2100 | 1500 |
| 2-7 | | | 2 | 2 | 8 | 15 | 3400 | 1600 | 2600 | 2800 | 2100 | 1500 |
| 2-8 | | | 5 | 2 | 8 | 15 | 3000 | 1500 | 2200 | 2400 | 1900 | 1400 |
| 2-9 | | | 5 | 5 | 3 | 15 | 2700 | 1300 | 1900 | 2100 | 1800 | 1300 |
| 2-10 | | | 5 | 5 | 8 | 6 | 2700 | 1300 | 1900 | 2100 | 1700 | 1200 |
| 2-11 | | | 5 | 5 | 8 | 15 | 2300 | 1000 | 1500 | 1700 | 1500 | 1000 |
| 2-12 | | | 10 | 10 | 15 | 30 | 2000 | 800 | 1300 | 1500 | 1200 | 500 |
| 2-13 | 0 | 0 | 2 | 2 | 8 | 6 | 3500 | 1700 | 2700 | 2900 | 2300 | 1700 |
| 2-14 | 0 | 0 | 2 | 2 | 3 | 15 | 3600 | 1700 | 2700 | 3000 | 2300 | 1700 |
| 2-15 | 0 | 0 | 2 | 2 | 8 | 15 | 3200 | 1400 | 2400 | 2600 | 1900 | 1400 |
| 2-16 | 0.050 | 0 | 2 | 2 | 8 | 6 | 3400 | 1700 | 2700 | 2900 | 2300 | 1700 |
| 2-17 | 0 | 0.050 | 2 | 2 | 3 | 15 | 3500 | 1700 | 2700 | 3000 | 2300 | 1700 |
| 2-18 | 0.030 | 0.030 | 2 | 2 | 8 | 15 | 3100 | 1400 | 2400 | 2600 | 2000 | 1400 |
| 2-19 | 0.050 | 0 | 2 | 2 | 8 | 6 | 3100 | 1900 | 2900 | 3100 | 2500 | 1900 |
| 2-20 | 0 | 0.050 | 2 | 2 | 3 | 15 | 3700 | 1900 | 2900 | 3200 | 2500 | 1900 |
| 2-21 | 0.030 | 0.030 | 2 | 2 | 8 | 15 | 3200 | 1600 | 2600 | 2800 | 2100 | 1500 |

| Specimen No. | Average crystal grain size (μm) | Compressive rupture strength of granulated powder (MPa) | Measured specific surface (m²/g) | Measured specific surface/ ideal specific surface | Remarks |
|---|---|---|---|---|---|
| 1-5 | 8 | 0.90 ± 0.05 | 0.448-0.493 | 1020-1110 | Example of invention |
| 2-1 | 10 | | | | Example of invention |
| 2-2 | 21 | | | | Comparative example |
| 2-3 | 32 | | | | Comparative example |
| 2-4 | 28 | | | | Comparative example |
| 2-5 | 23 | | | | Comparative example |
| 2-6 | 39 | | | | Comparative example |
| 2-7 | 45 | | | | Comparative example |
| 2-8 | 53 | | | | Comparative example |
| 2-9 | 59 | | | | Comparative example |
| 2-10 | 73 | | | | Comparative example |
| 2-11 | 205 | | | | Comparative example |
| 2-12 | 232 | | | | Comparative example |
| 2-13 | 28 | 1.25 ± 0.05 | 0.730-0.808 | 1640-1800 | Comparative example |
| 2-14 | 23 | | | | Comparative example |
| 2-15 | 45 | | | | Comparative example |
| 2-16 | 27 | | | | Comparative example |
| 2-17 | 22 | | | | Comparative example |
| 2-18 | 42 | | | | Comparative example |
| 2-19 | 27 | 0.90 ± 0.05 | 0.448-0.493 | 1020-1110 | Comparative example |
| 2-20 | 22 | | | | Comparative example |
| 2-21 | 42 | | | | Comparative example |

As described in Table 2, examples of the invention (Specimen Nos. 1-5 and 2-1) in which the content of S was less than 5 mass ppm, the content of Cl was less than 10 mass ppm, and the contents of P and B were less than 3 mass ppm, had an excellent characteristic in which, under the application of a direct-current magnetic field of 33 A/m, the incremental permeability μΔ was continuously 2000 or more in a temperature range of −40° C. to 85° C.

In contrast, in all the comparative examples (Specimen Nos. 2-2 to 2-21) in which the content of at least one of P, B, S, and Cl was more than the appropriate ranges, the incremental permeability μΔ at a temperature of at least one of −40° C., 0° C., 23° C., 70° C., and 85° C. was less than 2000.

Example 3

A pulverized powder having the same composition as in Specimen No. 1-5 was used as a raw material. By changing the temperature condition in granulation by a spray drying method, granulated powders having different compressive rupture strengths in the range of 0.70 to 1.40 MPa were obtained. The granulated powders were then compacted and fired under the same conditions as in EXAMPLE 1 to obtain sintered cores having an outer diameter of 6.0 mm, an inner diameter of 3.0 mm, and a height of 4.0 mm (ideal specific surface: $4.44 \times 10^{-4}$ m²/g).

A wire was wound ten turns around each specimen obtained in this way. While the core was under the application of a direct-current magnetic field of 33 A/m, the specimen was measured in terms of incremental permeability μΔ at −40° C., 0° C., 23° C., 70° C., and 85° C. at a measurement voltage of 100 mV and at a measurement frequency of 100 kHz with the same direct-current application apparatus and LCR meter as in EXAMPLE.

The compressive rupture strength of the granulated powders was measured in accordance with requirements of JIS Z 8841. The measured specific surface was also measured by a BET method (multipoint method) in JIS Z 8830 (2001) and the ratio of (measured specific surface/ideal specific surface) was determined. The initial permeability $\mu_i$ and the average crystal grain size were measured as in EXAMPLE 1.

The results are described in Table 3.

to achieve P: 2 mass ppm, B: 2 mass ppm, S: 3 mass ppm and Cl: 6 mass ppm) was mixed with zirconium oxide (in terms of $ZrO_2$), tantalum oxide (in terms of $Ta_2O_5$), hafnium oxide (in terms of $HfO_2$), and niobium oxide (in terms of $Nb_2O_5$) as sub-components such that the final compositions satisfied percentages in Table 4, and pulverized with a ball mill for 12 hours. The pulverized powders were mixed with polyvinyl alcohol, granulated at 180° C., and compacted into toroidal cores under the application of a pressure of 118 MPa. The compacts were then put into a kiln and fired at a maximum temperature of 1350° C. Thus, sintered cores having an outer

TABLE 3

| Specimen No. | Granulation temperature (° C.) | Compressive rupture strength of granulated powder (MPa) | Measured specific surface (m²/g) | Measured specific surface/ ideal specific surface | Initial permeability $\mu_i$ 23° C. | Incremental permeability under application of magnetic field of 33 A/m (μΔ) | | | | | Average crystal grain size (μm) | Remarks |
| --- | --- | --- | --- | --- | --- | --- | --- | --- | --- | --- | --- | --- |
| | | | | | | −40° C. | 0° C. | 23° C. | 70° C. | 85° C. | | |
| 1-5 | 180 | 0.90 | 0.475 | 1070 | 4500 | 2600 | 3800 | 4000 | 3300 | 2700 | 8 | Example of invention |
| 3-1 | 150 | 0.70 | 0.426 | 960 | 4700 | 2800 | 4000 | 4200 | 3500 | 2900 | 9 | Example of invention |
| 3-2 | 170 | 0.80 | 0.444 | 1000 | 4600 | 2800 | 3900 | 4100 | 3400 | 2800 | 9 | Example of invention |
| 3-3 | 190 | 1.03 | 0.559 | 1260 | 4400 | 2600 | 3700 | 3900 | 3100 | 2600 | 8 | Example of invention |
| 3-4 | 200 | 1.08 | 0.635 | 1430 | 4400 | 2500 | 3700 | 3900 | 3000 | 2500 | 8 | Example of invention |
| 3-5 | 220 | 1.14 | 0.684 | <u>1540</u> | 4100 | <u>2400</u> | 3300 | 3600 | 2800 | <u>2300</u> | 8 | Comparative example |
| 3-6 | 250 | 1.25 | 0.768 | <u>1730</u> | 4000 | <u>2300</u> | 3000 | 3400 | 2500 | <u>2200</u> | 8 | Comparative example |
| 3-7 | 290 | 1.40 | 0.875 | <u>1970</u> | 3800 | <u>2100</u> | 2800 | 3100 | <u>2200</u> | 2000 | 8 | Comparative example |

Examples of the invention (Specimen Nos. 1-5 and 3-1 to 3-4) in which the granulated powders had a compressive rupture strength of less than 1.10 MPa and, as a result, the specific surfaces of the cores decreased and the ratios of measured specific surface/ideal specific surface were less than 1500, had an excellent characteristic in which, under the application of a direct-current magnetic field of 33 A/m, the incremental permeability μΔ was 2500 or more in a temperature range of −40° C. to 85° C.

However, comparative examples (Specimen Nos. 3-5 to 3-7) in which the granulated powders had a compressive rupture strength of 1.10 MPa or more and the ratios of measured specific surface/ideal specific surface were 1500 or more, that is, a large number of cavities were contained due to insufficient disintegration of the granulated powders, did not achieve an incremental permeability μΔ of 2500 or more in the entire temperature range of −40° C. to 85° C.

Example 4

A calcined powder having the same composition as in Specimen No. 1-5 (note that adjustment was performed so as diameter of 6.0 mm, an inner diameter of 3.0 mm, and a height of 4.0 mm (ideal specific surface: $4.44 \times 10^{-4}$ m²/g) were obtained.

A wire was wound ten turns around each specimen obtained in this way. The specimen was measured in terms of incremental permeability μΔ at −40° C., 0° C., 23° C., 70° C., and 85° C. at a measurement voltage of 100 mV and at a measurement frequency of 100 kHz under the application of a direct-current magnetic field of 33 A/m with the same direct-current application apparatus and LCR meter as in EXAMPLE. The compressive rupture strength of the granulated powders was measured in accordance with requirements of JIS Z 8841. The measured specific surface was also measured by a BET method (multipoint method) in JIS Z 8830 (2001). The ideal specific surface was calculated from size and weight that were measured in accordance with JIS C 2560. The ratio of (measured specific surface/ideal specific surface) was calculated from the ideal specific surface of $4.44 \times 10^{-4}$ m²/g). The initial permeability $\mu_i$ and the average crystal grain size were measured as in EXAMPLE 1.

The results are described in Table 4.

TABLE 4

| Specimen No. | Sub-components (mass %) | | | | Initial permeability $\mu_i$ | Incremental permeability under application of magnetic field of 33 A/m ($\mu\Delta$) | | | | | Average crystal grain size |
|---|---|---|---|---|---|---|---|---|---|---|---|
| | $ZrO_2$ | $Ta_2O_5$ | $HfO_2$ | $Nb_2O_5$ | 23° C. | −40° C. | 0° C. | 23° C. | 70° C. | 85° C. | ($\mu m$) |
| 1-5 | 0 | 0 | 0 | 0 | 4800 | 2600 | 3800 | 4000 | 3300 | 2700 | 7 |
| 4-1 | 0.050 | 0 | 0 | 0 | 4700 | 2800 | 4000 | 4200 | 3500 | 2900 | 7 |
| 4-2 | 0 | 0.050 | 0 | 0 | 4700 | 2800 | 4000 | 4200 | 3500 | 2900 | 7 |
| 4-3 | 0 | 0 | 0.050 | 0 | 4600 | 2700 | 3900 | 4100 | 3400 | 2800 | 7 |
| 4-4 | 0 | 0 | 0 | 0.050 | 4700 | 2800 | 4000 | 4200 | 3600 | 2900 | 7 |
| 4-5 | 0.030 | 0.030 | 0 | 0 | 4700 | 2800 | 4000 | 4200 | 3500 | 3000 | 6 |
| 4-6 | 0.030 | 0 | 0.030 | 0 | 4600 | 2800 | 3900 | 4100 | 3400 | 2800 | 7 |
| 4-7 | 0.030 | 0 | 0 | 0.030 | 4700 | 2900 | 4100 | 4300 | 3500 | 3000 | 7 |
| 4-8 | 0 | 0.030 | 0.030 | 0 | 4600 | 2800 | 3900 | 4100 | 3400 | 2800 | 7 |
| 4-9 | 0 | 0.030 | 0 | 0.030 | 4700 | 2900 | 4000 | 4200 | 3600 | 2900 | 7 |
| 4-10 | 0 | 0 | 0.030 | 0.030 | 4600 | 2800 | 3900 | 4100 | 3400 | 2800 | 7 |
| 4-11 | 0.020 | 0.020 | 0.020 | 0 | 4600 | 2800 | 3900 | 4100 | 3400 | 2800 | 6 |
| 4-12 | 0.020 | 0.020 | 0 | 0.020 | 4700 | 3000 | 4100 | 4300 | 3600 | 3000 | 6 |
| 4-13 | 0.020 | 0 | 0.020 | 0.020 | 4600 | 2800 | 3900 | 4100 | 3400 | 2800 | 7 |
| 4-14 | 0 | 0.020 | 0.020 | 0.020 | 4600 | 2800 | 3800 | 4000 | 3400 | 2800 | 7 |
| 4-15 | 0.020 | 0.020 | 0.020 | 0.020 | 4600 | 2900 | 3900 | 4200 | 3600 | 3000 | 6 |
| 4-16 | <u>0.080</u> | 0 | 0 | 0 | 3700 | <u>1900</u> | 2800 | 3100 | 2300 | <u>1900</u> | 121 |
| 4-17 | <u>0.080</u> | 0 | 0 | <u>0.080</u> | 3400 | <u>1700</u> | 2700 | 2900 | <u>2100</u> | 1800 | 140 |
| 4-18 | <u>0.080</u> | <u>0.080</u> | <u>0.080</u> | <u>0.080</u> | 2400 | <u>1100</u> | <u>1500</u> | <u>1600</u> | <u>1400</u> | <u>1100</u> | 193 |
| 4-19 | 0.05 | 0 | 0 | 0 | 3900 | 2400 | 3200 | 3400 | 2600 | 2200 | 7 |
| 4-20 | 0 | 0 | 0 | 0.050 | 3900 | 2400 | 3200 | 3500 | 2600 | 2200 | 7 |
| 4-21 | 0.030 | 0 | 0.030 | 0 | 3900 | 2400 | 3100 | 3400 | 2600 | 2200 | 7 |
| 4-22 | 0 | 0.030 | 0 | 0.030 | 4000 | 2400 | 3100 | 3400 | 2600 | 2200 | 6 |
| 4-23 | 0.020 | 0.020 | 0 | 0.020 | 4000 | 2400 | 3100 | 3400 | 2600 | 2200 | 6 |
| 4-24 | <u>0.080</u> | 0 | 0 | <u>0.080</u> | 3200 | <u>1500</u> | 2400 | 2600 | <u>1800</u> | <u>1500</u> | 190 |

| Specimen No. | Compressive rupture strength of granulated powder (MPa) | Measured specific surface ($m^2/g$) | Measured specific surface/ideal specific surface | Remarks |
|---|---|---|---|---|
| 1-5 | 0.90 ± 0.05 | 0.448-0.493 | 1020-1110 | Example of invention |
| 4-1 | | | | Example of invention |
| 4-2 | | | | Example of invention |
| 4-3 | | | | Example of invention |
| 4-4 | | | | Example of invention |
| 4-5 | | | | Example of invention |
| 4-6 | | | | Example of invention |
| 4-7 | | | | Example of invention |
| 4-8 | | | | Example of invention |
| 4-9 | | | | Example of invention |
| 4-10 | | | | Example of invention |
| 4-11 | | | | Example of invention |
| 4-12 | | | | Example of invention |
| 4-13 | | | | Example of invention |
| 4-14 | | | | Example of invention |
| 4-15 | | | | Example of invention |
| 4-16 | | | | Comparative example |
| 4-17 | | | | Comparative example |
| 4-18 | | | | Comparative example |
| 4-19 | 1.25 ± 0.05 | 0.730-0.808 | 1640-1800 | Example of invention |
| 4-20 | | | | Example of invention |
| 4-21 | | | | Example of invention |
| 4-22 | | | | Example of invention |
| 4-23 | | | | Example of invention |
| 4-24 | | | | Comparative example |

As is clear from Table 4, all the examples of the invention (Specimen Nos. 4-1 to 4-15) in which appropriate amounts of one or more selected from $ZrO_2$, $Ta_2O_5$, $HfO_2$, and $Nb_2O_5$ were added had excellent values: under, the application of a direct-current magnetic field of 33 A/m, the incremental permeability $\mu\Delta$ was continuously 2700 or more in a temperature range of −40° C. to 85° C. Thus, these examples had characteristic values equivalent to or better than those of the example of the invention (Specimen No. 1-5) without such components.

However, in comparative examples (Specimen Nos. 4-16 to 4-18) in which at least one of the four components was added in large amounts more than the upper limit, exaggerated grain growth was caused and the incremental permeability $\mu\Delta$ under the application of a direct-current magnetic field of 33 A/m considerably decreased in the entire temperature range.

When appropriate amounts of one or more selected from $ZrO_2$, $Ta_2O_5$, $HfO_2$, and $Nb_2O_5$ were added, as demonstrated in the examples of the invention (Specimen Nos. 4-19 to 4-23), although the ratios of (measured specific surface/ideal specific surface) were 1500 or more, as long as the ratios were 1850 or less, an excellent characteristic was achieved: the incremental permeability $\mu\Delta$ was continuously 2200 or more in a temperature range of −40° C. to 85° C. under the application of a direct-current magnetic field of 33 A/m. In contrast, in Specimen No. 4-24, since the amounts of $ZrO_2$ and $Nb_2O_5$ added were more than the appropriate amounts, the incremental permeability decreased.

INDUSTRIAL APPLICABILITY

According to the present invention, a Mn—Zn—Co ferrite core having an excellent characteristic can be obtained in which the incremental permeability $\mu\Delta$ is continuously 2000 or more in a wide temperature range of −40° C. to 85° C. under the application of a direct-current magnetic field of 33 A/m. Such a Mn—Zn—Co ferrite core is advantageously applicable to, for example, a magnetic core of a pulse transformer in an Ethernet device.

The invention claimed is:

1. A Mn—Zn—Co ferrite core comprising a basic component, sub-components, and unavoidable impurities, wherein, as the sub-components,
   silicon oxide (in terms of $SiO_2$): 50 to 400 mass ppm and
   calcium oxide (in terms of CaO): 1000 to 4000 mass ppm
      are added to the basic component consisting of
   iron oxide (in terms of $Fe_2O_3$): 51.0 to 53.0 mol %,
   zinc oxide (in terms of ZnO): more than 12.0 mol % and 18.0 mol % or less,
   cobalt oxide (in terms of CoO): 0.04 to 0.60 mol %, and
   manganese oxide (in terms of MnO): balance;
amounts of phosphorus, boron, sulfur, and chlorine in the unavoidable impurities are reduced as follows
   phosphorus: less than 3 mass ppm,
   boron: less than 3 mass ppm,
   sulfur: less than 5 mass ppm, and
   chlorine: less than 10 mass ppm; and
a ratio of a measured specific surface of the Mn—Zn—Co ferrite core to an ideal specific surface of the Mn—Zn—Co ferrite core satisfies formula (1) below $$\text{Measured specific surface/ideal specific surface} < 1500 \quad (1)$$

where the measured specific surface represents a specific surface ($m^2/g$) determined by a BET method (multipoint method) in JIS Z 8830 (2001); and the ideal specific surface represents a specific surface ($m^2/g$) calculated from size and mass of the core on an assumption that the core is in an ideal state of having no cavities.

2. The Mn—Zn—Co ferrite core according to claim 1, wherein the sub-components further include one or more selected from zirconium oxide (in terms of $ZrO_2$): 0.005 to 0.075 mass %;
   tantalum oxide (in terms of $Ta_2O_5$): 0.005 to 0.075 mass %;
   hafnium oxide (in terms of $HfO_2$): 0.005 to 0.075 mass %; and
   niobium oxide (in terms of $Nb_2O_5$): 0.005 to 0.075 mass %.

3. The Mn—Zn—Co ferrite core according to claim 2, wherein the ratio of the measured specific surface of the Mn—Zn—Co ferrite core to the ideal specific surface of the Mn—Zn—Co ferrite core satisfies formula (1)' below $$\text{Measured specific surface/ideal specific surface} \leq 1850 \quad (1)$$

where the measured specific surface represents a specific surface ($m^2/g$) determined by the BET method (multipoint method) in JIS Z 8830 (2001); and the ideal specific surface represents a specific surface ($m^2/g$) calculated from the size and mass of the core on the assumption that the core is in the ideal state of having no cavities.

4. A method for producing the Mn—Zn—Co ferrite core according to claim 1, the method comprising calcining the basic component according to claim 1 to provide a calcined powder, mixing the calcined powder with the sub-components according to claim 1, subsequently granulating the mixture of the calcined powder with the subcomponents into a granulated powder having a compressive rupture strength of 1.10 MPa or less, and then compacting and subsequently firing the granulated powder.

5. A method for producing the Mn—Zn—Co ferrite core according to claim 3, the method comprising calcining the basic component to provide a calcined powder, mixing the calcined powder with the sub-components, subsequently granulating the mixture of the calcined powder with the sub-components into a granulated powder having a compressive rupture strength of 1.30 MPa or less, and then compacting and subsequently firing the granulated powder.

* * * * *